United States Patent [19]

Owades

[11] Patent Number: 4,622,224
[45] Date of Patent: Nov. 11, 1986

[54] PREPARATION OF WORT EXTRACTS

[76] Inventor: Joseph L. Owades, 3097 Wood Valley Rd., Sonoma, Calif. 95476

[21] Appl. No.: 644,805

[22] Filed: Aug. 27, 1984

[51] Int. Cl.$^4$ .......................... C12C 11/04; C12C 9/00
[52] U.S. Cl. ........................................ 426/16; 426/18; 426/19; 426/29; 426/64
[58] Field of Search ...................... 426/16, 18, 19, 29, 426/64

[56] References Cited

U.S. PATENT DOCUMENTS

| | | | |
|---|---|---|---|
| 1,737,279 | 11/1929 | Wailerstein | 426/29 |
| 3,022,174 | 2/1962 | Wimmer et al. | 426/29 |
| 3,712,820 | 1/1973 | Walmsley et al. | 426/29 |
| 3,908,021 | 9/1975 | Rehberger et al. | 426/29 |
| 4,138,499 | 2/1979 | Strauss et al. | 426/29 |
| 4,495,204 | 1/1985 | Weaver et al. | 426/29 |

*Primary Examiner*—Jeanette Hunter
*Attorney, Agent, or Firm*—Hayes, Davis & Soloway

[57] ABSTRACT

A method for producing a wort containing a reduced level of fermentable sugars is described. The method consists of providing a warm aqueous suspension of ground malt, and adding the warm suspension to a boiling aqueous suspension of cereal adjuncts while avoiding temperatures between about 52° and 72° C. The resulting wort is useful for producing a beer with a lower-than-normal alcohol content, or a malt beverage lacking sweetness usually associated with malt beverages.

11 Claims, No Drawings

PREPARATION OF WORT EXTRACTS

FIELD OF THE INVENTION

The present invention relates generally to a method for preparing a wort extract. More particularly, the invention relates to a method for preparing an extract of malt containing a reduced level of simple, fermentable sugars. The wort extracts may be used in a traditional brewing process, for producing a beer of reduced alcohol content, or for producing a non-alcoholic malt beverage lacking in sweetness usually associated with such malt beverages.

DESCRIPTION OF THE PRIOR ART

In the production of beer, yeast is used to ferment into ethyl alcohol a substrate made of a mixture of fermentable carbohydrates so called "wort carbohydrates." The wort carbohydrates involved which can be fermented by Brewers' yeast are normally maltose, glucose, maltotriose and traces of sucrose and fructose. They are obtained by allowing malt enzymes (alpha and beta amylase) to transform starch molecules from malt and other adjuncts into the fermentable sugars outlined above. This is done during the so-called mashing operation.

Conventional mashing involves mixing together of malt and cereal adjuncts in hot water, followed by a series of heating and resting cycles. Substances which are solubilized in the hot water are collectively called the extract. Following mashing, the soluble materials are extracted during lautering, leaving behind the spent grain. A clear liquid (wort) obtained by the extraction may then be transferred to a brew kettle and boiled for a period of time (kettle boiled) which inactivates the malt enzymes. Wort compositions vary depending on the raw materials and mash cycle employed.

A typical wort used in brewing may comprise the mixed extract of a barley malt mash and a cereal adjuncts mash typically of corn grits or rice. Such mixed extract may be obtained by treating a kiln dried barley malt with warm water, at about 50° C., in one vessel, the so-called "mash tub", and boiling the cereal adjuncts, (e.g. corn grits or rice) in another vessel, the so-called "cooker," and then adding the boiling contents of the cooker to the warm malt suspension in the mash tub. This serves to raise the temperature of the mash tub contents to about 57°–67° C. During the rise from 50° C. to about 67° C., and starting at around 63° C., the enzymes in the malt and in particular beta-amylase which is most active between 60° and 70° C., partially degrade the starches in both the malt itself and in the corn grits or rice to form simple fermentable sugars, primarily glucose, fructose and maltose. These simple sugars are fairly sweet tasting, and also are fermentable by Brewers' yeast to alcohol and carbon dioxide.

Enzymatic processes dominate the entire mashing process and are the direct continuation and completion of processes initiated during the steeping and germination of the malt and suspended abruptly by the drying action of kilning. The time span utilized in adding the cooker contents to the mash tub and the temperature of the combined mash (and rest times) determine the proportion of fermentable sugars in the wort, and the wort's sweetness. This proportion, in turn, determines the degree of fermentability of the wort. Typically, an addition time of five to fifteen minutes coupled with a subsequent rise in temperature caused by injection of live steam or by contact with a heated surface, will result in a major amount of the available starch being converted to fermentable sugars. Those breweries which use, instead of corn grits or rice, a prehydrolized corn syrup, which does not need to be either boiled or acted upon by malt enzymes, may either add just boiling water to the mash tub to secure the aforesaid rise in temperature, or provide adequate heating surface to heat the mash tub quickly. In either case, the level of fermentable sugars typically may vary between 50 and 75% by weight. This has suited the purposes of breweries worldwide.

Recently, there has developed consumer interest in beers of reduced alcoholic content and/or non-alcoholic malt beverages lacking in sweetness. Typically, reduced alcohol content beer is formed by brewing beer in a conventional manner and diluting the beer with water, or by mixing a typical, fermented malt beverage with about equal volumes of unfermented wort, or by attempting to reduce the time span between 50° C. and 75° C. by rapid addition of boiling water, or by physically removing a part of the alcohol from the fermented product. Such processes are not entirely satisfactory, since the resulting products are beers of reduced flavor intensity.

It is thus a primary object of the present invention to provide a new and improved process for producing an extract of malt which overcomes the aforesaid and other disadvantages of the prior art. Another object of the present invention is to provide a novel and improved process for producing a wort containing a reduced level of simple, fermentable sugars. Still other objects of the present invention are to provide a method for producing a beer of reduced alcohol content, or a malt beverage lacking in sweetness. A specific object of the invention is to provide a novel and improved method for producing a wort having a relatively low level of fermentable sugars, using existing equipment and materials. Still other objects of the invention will in part be obvious and will in part be apparent hereinafter.

These and other objects of the present invention are achieved by processing a warm malt mash under conditions which avoid exposing the malt mash to temperatures between about 52° C. and about 75° C. In a preferred embodiment of the invention, the malt mash is added directly to the contents of the cereal cooker under conditions such that the temperature in the contents of the cooker does not fall below about 75° C. anytime during the addition, and specifically avoids the temperature range between about 52° C. and about 75° C. A wort extract is obtained having a reduced level of simple, fermentable sugars, which may then be further processed into beer lacking in alcohol content, or a malt beverage of reduced sweetness.

The invention accordingly comprises the processes involving the several steps and relation of one or more such steps with respect to each other, and the materials and products possessing the features, properties and relations of elements, all of which are exemplified in the detailed description, and the scope of the application, which will be indicated in the claims.

Generally, the process of the present invention comprises batch preparation of ground malt mash and a boiled cereal adjuncts. The ground mash is prepared by mixing a measured quantity of dried malt with warm water, e.g. in a mash tub. Typically, the water is maintained at a temperature in the range of 40° C. to 50° C., and not much higher than 50° C. After addition of all the malt the mash is then heated for a period of an hour or less.

Concurrent with the formation of the malt mash in the mash tub, a measured quantity of cereal adjuncts such as corn grits or rice is mixed in water and heated to boiling in a cereal cooker. A small amount of malt, or other source of alpha-amylase, is added to the cooker.

The contents of the mash tub are then added to the boiling cereal in the cooker. The malt mash first added to the boiling cereal substantially instantly is raised to a temperature of about 100° C., with the successive quantities of the malt mash being heated to successively lower temperatures. The relative quantities of liquids in the cooker and mash tub are chosen so that the final temperature, i.e., upon completion of the addition of the entire malt mash to the ceral adjuncts, is at least about 75° C. At this temperature the sugar-producing beta-amylase is in large part inactive, while the alpha-amylase present is sufficiently active to break down the starches to soluble dextrins and thus provide the desired extract. This will be true as long as the temperature during the addition is maintained above 75° C.

If desired, small quantities of a heat-stable alpha-amylase may be added to the malt mash/cereal mixture to enhance the alpha-amylase action.

The mash may then be filtered in a Lauter tub, mash filter or other means, and resulting wort boiled with hops, filtered, cooled and fermented with yeast in the usual manner to produce a beer, ale, malt liquor or stout. The resulting beer is characterized by a lower-than-normal alcohol content. Alternatively, the wort may be cooled, treated with any desired supplements such as lactic acid, and the resulting liquid mixture filtered, carbonated if desired, and packaged as a non-alcoholic malt beverage which is characterized as lacking sweetness.

The present invention will be further described in the following working examples.

WORKING EXAMPLES

The following examples, illustrative of the present invention, employ a conventional, two vessel brew house with a mash tub and a cereal cooker or boiler vessel. The mash tub and cereal cooker are tied to one another via a valved conduit, and a pump. The basic procedure was to suspend dried, ground barley malt in water, heat the resulting suspension to a desired temperature, and hold the resulting mash suspension at the desired temperature for a period of time. Concurrently, the cereal adjucts, if desired containing also a small amount of malt, are added to water and cooked (boiled) a period of time. The mash is then mixed into the boiling cereal, with stirring. In Example I, the malt is mashed in the mash tub and the cereal adjuncts (corn and malt) boiled in the cereal cooker. In Example II, the malt is mashed in the cereal cooked and the cereal adjuncts (rice and malt) boiled in the mash tub.

EXAMPLE I 11,000 pounds of corn grits and 1,100 pounds of barley malt were added to 160 barrels of water, and the resulting mixture heated to boiling, with stirring, for thirty minutes in a cereal cooker.

Concurrently, 17,000 pounds of malt were added to 170 barrels of water, and heated to 52° C., with stirring, in a mash tub. The resulting malt mash was held at 52° C. for fifteen minutes, and the contents of the mash tub were then rapidly pumped over into the cereal boiler, and stirred. The temperature of the resulting mixture at the completion of the addition of the malt mash was about 75° C.

The resulting wort was analyzed and was found to contain approximately twenty-five percent fermentable sugars, by weight.

EXAMPLE II 17,000 pounds of malt were added to 170 barrels of water in a cereal cooker, heated to 50° C., and held at 50° C. for fifteen minutes in the cereal cooker.

11,000 pounds of rice and 110 pounds of barley malt were added to 160 barrels of water in a mash tub, and heated to boiling, with stirring, for thirty minutes.

The contents of the cereal cooker were then pumped over into the mash tub, and stirred. The temperature of the mixture at the completion of the addition of the malt mash to cereal adjucts was about 75° C. One pound of high temperature alpha-amylase (Fungamyl brand, available from Novo Laboratories, Inc.), was added to the resulting mash blend, and the mixture stirred for fifteen minutes at 75° C. The resulting mixture was then analyzed and was found to contain approximately twenty-five percent simple sugars, by weight.

EXAMPLE III

The wort prepared in Example I was filtered and the filtrate was boiled with one hundred pounds of hops, strained and cooled to about 10° C. The resulting mixture was then transferred to a fermentation tank to which was added five hundred pounds of brewers yeast. The resulting mixture was allowed to ferment for seven days. After letting the yeast settle out, and filtering, the resulting filtrate beer was bottled. The alcoholic content was measured and determined to be two percent by weight.

EXAMPLE IV

A feature and advantage of the present invention is that the novel and desirable wort containing low levels of simple (fermentable) sugars may be prepared using existing manufacturing equipment, i.e., without involving any capital investment. If the available vessels for mashing and boiling are appropriately sized, the equipment can be used in a conventional manner, i.e. forming the mash in the mash tub, and boiling the cereal adjuncts in the cereal boiler. The principal difference in accordance with the present invention then involves reversing the addition of the mash to the boiling cereal. If, on the other hand, the available vessels for mashing and cooking are not appropriately sized so as practically and conveniently to practice the reverse addition according to the present invention, the mash tub may be used to boil the cereal adjuncts, and the cereal cooker used to form the malt mash.

Certain changes may be made in the above processes without departing from the scope of the invention herein involved. For example, the wort may be processed as above described using only boiling water, i.e. without cereal adjuncts. Still other changes will be obvious to one skilled in the art. It is therefore intended that all matter contained in the above description shall be interpreted as illustrative and not in a limiting sense.

I claim:

1. In a method for producing a wort in which a warm malt mash is blended with hot water at a temperature above 75° C., the improvement which comprises blending said warm malt mash and hot water under conditions which avoid exposing the blend of hot water and the malt mash to temperatures between about 52° C. and about 75° C. so as to avoid appreciable conversion of the blended malt mash to simple sugars.

2. In a method according to claim 1, improvement wherein said malt mash is heated to a temperature in the range of about 50° C. prior to said blending.

3. In a method according to claim 1, the improvement wherein said water is heated to or near the boiling point, and said malt mash is added to said heated water.

4. In a method according to claim 1, the improvement wherein said water contains cereal adjuncts, and said malt mash is added to said adjuncts containing water.

5. In a method according to claim 4, the improvement wherein said cereal adjuncts comprises corn grits or rice.

6. In a method according to claim 4, the improvement which comprises adding a small amount of alpha-amylase source to said cereal adjuncts-containing water.

7. A method of producing a wort having a low level of simple sugars, comprising the steps of:

(A) forming a warm suspension of malt in water;
(B) forming a boiling suspension of cereal adjuncts in water; and
(C) adding said warm suspension of malt to said boiling suspension of cereal adjuncts, whereby to maintain the temperature of said cereal adjuncts throughout said additive step at least about 75° C.

8. In a method of producing beer, wherein a wort is pitched with yeast, the improvement which comprises employing as said wort the wort as produced in accordance with the method of claim 1.

9. In a method of producing a non-alcoholic malt flavored beverage wherein a wort is carbonated, the improvement which comprises employing as said wort the wort as produced in accordance with the method of claim 1.

10. A malt beverage in which only about 25% of the carbohydrates are fermentable and made from a wort prepared by the method of claim 1.

11. A malt beverage according to claim 10, which beverage is fermented.

* * * * *